(12) United States Patent
Kikuchi et al.

(10) Patent No.: US 6,640,652 B2
(45) Date of Patent: Nov. 4, 2003

(54) ROTATION ANGLE SENSOR CAPABLE OF ACCURATELY DETECTING ROTATION ANGLE

(75) Inventors: Seiji Kikuchi, Miyagi-ken (JP); Masao Kasashima, Miyagi-ken (JP); Ichiro Tokunaga, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/263,887

(22) Filed: Oct. 2, 2002

(65) Prior Publication Data

US 2003/0070497 A1 Apr. 17, 2003

(30) Foreign Application Priority Data

Oct. 17, 2001 (JP) ........................................ 2001-318981

(51) Int. Cl.$^7$ ................................................ G01L 3/02
(52) U.S. Cl. ............................. 73/862.333; 324/207.21
(58) Field of Search ................. 73/862.333; 324/207.21

(56) References Cited

U.S. PATENT DOCUMENTS

| | | | |
|---|---|---|---|
| 4,845,456 A | | 7/1989 | Abe et al. |
| 5,148,106 A | * | 9/1992 | Ozawa .................. 324/207.21 |
| 5,341,261 A | | 8/1994 | Dieny et al. ................ 360/113 |
| 6,027,767 A | * | 2/2000 | Scholl et al. ............... 427/384 |
| 6,054,226 A | * | 4/2000 | Takeda et al. ............... 428/682 |
| 6,172,589 B1 | * | 1/2001 | Fujita et al. ................ 335/306 |
| 6,288,533 B1 | * | 9/2001 | Haeberli et al. ......... 324/207.2 |
| 6,425,961 B1 | * | 7/2002 | Kojima et al. ............... 148/302 |
| 2001/0020847 A1 | * | 9/2001 | Mattheis et al. ........ 324/207.21 |

FOREIGN PATENT DOCUMENTS

| | | |
|---|---|---|
| DE | 199 33 243 A1 | 2/2000 |
| FR | 2 776 064 | 3/1998 |
| JP | 2000-180524 | 6/2000 |

OTHER PUBLICATIONS

Gerhard Hager, "Magnetoresistive Sensoren Messen Drehwinkel", Dec. 1993, Elektronik.

Eijkel, et al., "A Thin–film Magnetoresistive Angle Detector," Mar. 1990, Sensors and Actuators.

* cited by examiner

*Primary Examiner*—Edward Lefkowitz
*Assistant Examiner*—Takisha S Miller
(74) *Attorney, Agent, or Firm*—Beyer Weaver & Thomas, LLP (57) ABSTRACT

When shape anisotropy energy (H) of giant magnetoresistive elements (GMR elements) is expressed by $H = A*Js*(Br/\pi)$ using saturation magnetization Js of a free magnetic layer and remanent magnetic flux density Br, A is set within a range of $-350 < A < 0$, and pairs of the GMR elements having opposite directions of fixed magnetization are electrically connected so that a differential of electric resistance values between electrode layers is outputted.

4 Claims, 8 Drawing Sheets

ROTATION ANGLE SENSOR CAPABLE OF ACCURATELY DETECTING ROTATION ANGLE

BACKGROUND OF THE INVENTION

1. Field of the Invention

This invention relates to a rotation angle sensor which uses giant magnetoresistive elements showing a large change in resistance in accordance with a change of an external magnetic field.

2. Description of the Related Art

A conventional rotation angle sensor will now be described with reference to FIG. 8. In the conventional rotation angle sensor, each of giant magnetoresistive elements RA, RB formed on a board (not shown) has a multilayer body C5 which is constituted by an antiferromagnetic layer 51, a fixed magnetic layer 52 stacked on the antiferromagnetic layer 51 and having its direction of magnetization fixed by the antiferromagnetic layer 51, a non-magnetic conductive layer 53, and a free magnetic layer 54 facing the fixed magnetic layer 52 with the non-magnetic conductive layer 53 held between them, and also has a pair of electrodes (not shown) holding the multilayer body C5 from both sides. The multilayer body C5 has a rectangular planar shape and its length in the long-side direction is approximately several mm.

Figure 8:
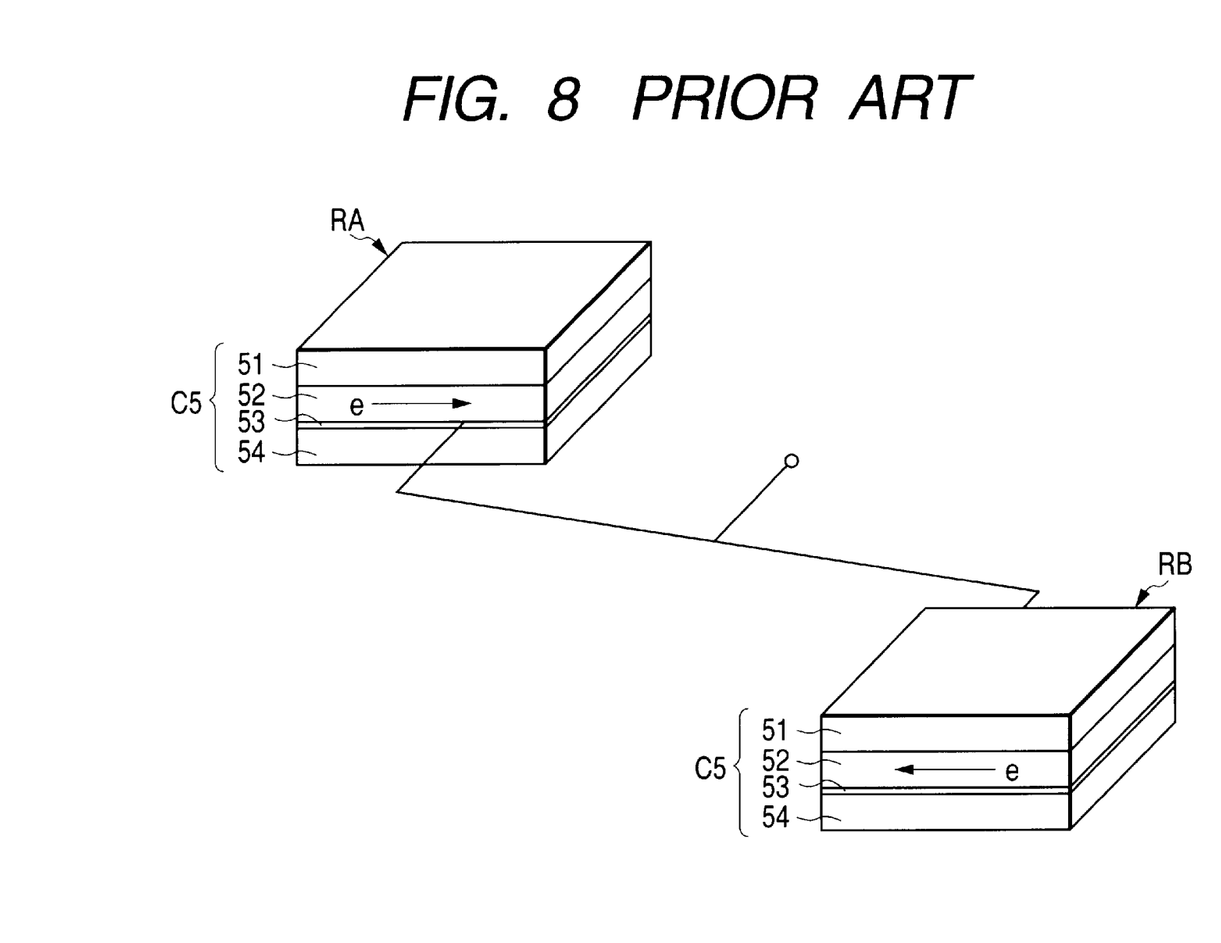
FIG. 8 is an explanatory view for explaining a connection state of giant magnetoresistive elements according to a conventional rotation angle sensor

Such giant magnetoresistive elements RA, RB are provided to form a pair so that their fixed magnetic layers 52 have opposite directions of magnetization (directions e in FIG. 8). The pair of giant magnetoresistive elements RA, RB are electrically connected with each other so that a differential is outputted with respect to the electric resistance value between the electrode layers.

A rotating part (not shown) facing the board has a magnet which is magnetized as the north pole and the south pole on the side facing the board. The magnetized side is rotatable facing the pair of giant magnetoresistive elements RA, RB. As the rotation of the magnet causes a magnetic field applied to the giant magnetoresistive elements RA, RB to rotate within a plane parallel to the board on which the giant magnetoresistive elements RA, RB, the direction of the magnetization of the free magnetic layer 54 in the giant magnetoresistive elements RA, RB changes in accordance with the direction of the magnetic field of the rotating magnet.

The electric resistance value between the electrode layers of the giant magnetoresistive elements RA, RB is reduced when the direction of magnetization of the free magnetic layer 54 is coincident with the direction of magnetization of the fixed magnetic layer 52. The electric resistance value is raised when the direction of magnetization of the free magnetic layer 54 is opposite to the direction of magnetization of the fixed magnetic layer 52. In this case, since the fixed magnetic layers 52 of the giant magnetoresistive elements RA, RB have opposite directions of magnetization to each other, the giant magnetoresistive elements RA, RB have opposite changes in electric resistance value due to the rotation of the magnet. With respect to a pair of such giant magnetoresistive elements RA, RB, a magnetic noise component due to a change in magnetic field environment or the like is eliminated from the differential output related to the electric resistance value.

The differential output based on the change in electric resistance value of the pair of giant magnetoresistive elements RA, RB can be found as a function $\sin\theta$ with $\theta$ being a variable, where $\theta$ represents the rotation angle of the magnet to the giant magnetoresistive elements RA, RB.

However, in such a conventional rotation angle sensor, since the multilayer bodies C5 of the giant magnetoresistive elements RA, RB are large, the magnet having a length of approximately several cm between both poles causes the magnetic field generated by the magnet to be strained at the ends of the multilayer bodies C5 and a uniform magnetic field cannot be applied to the multilayer bodies C5, making it difficult to accurately detect the rotation angle $\theta$. Moreover, the giant magnetoresistive elements R of such a large size have a disadvantage of high material cost.

If a magnet which can apply a uniform magnetic field to the multilayer bodies C5 is increased in size, the rotation angle sensor is increased in size. Moreover, if the size of the multilayer bodies C5 of the giant magnetoresistive elements RA, RB is reduced to 1 mm or less to enable uniform application of a magnetic field to the multilayer bodies C5 by the magnet, the differential output of the electric resistance value is deviated from the function of $\sin\theta$ and the angle $\theta$ cannot be detected accurately.

SUMMARY OF THE INVENTION

It is an object of the present invention to provide a rotation angle sensor which can accurately detect the rotation angle with its output accuracy improved without increasing the size.

A rotation angle sensor according to the present invention comprising: a fixed part on which giant magnetoresistive elements are provided, each of the giant magnetoresistive elements having a multilayer body including a fixed magnetic layer with a fixed direction of magnetization, a non-magnetic conductive layer, and a free magnetic layer facing said fixed magnetic layer with said non-magnetic conductive layer held between them, and electrode layers connected both ends of said multilayer body; and a rotating part which forms a magnetic field and rotates facing said fixed part, wherein said giant magnetoresistive elements with their fixed magnetic layers having opposite directions of magnetization are provided as a pair on a surface of said fixed part, and said giant magnetoresistive elements as a pair are connected so that a difference between their resistance values is outputted, thus detecting a magnetic field component parallel to the surface of said fixed part provided from said rotating part to said giant magnetoresistive elements, wherein the size of said multilayer body of said giant magnetoresistive element is 1 mm or smaller, and when the shape anisotropy energy (H) of said free magnetic layer is expressed by $H=A*Js*(Br/\pi)$, where Js represents saturation magnetization of a magnetic material forming said free magnetic layer and Br represents remanent magnetic flux density of the magnetic material forming said free magnetic layer, $-350<A<0$ holds.

Such a rotation angle sensor is small and can accurately detect the rotation angle since a uniform magnetic field can be applied to the multilayer bodies without using a large magnet. Moreover, as the shape anisotropy energy of the free magnetic layer is relaxed, the output can be expressed substantially by a function $\sin\theta$ with respect to a rotation angle $\theta$ and the rotation angle can be accurately detected. Magnetostriction is almost zero, and when the giant magnetoresistive elements constitute a Wheatstone bridge circuit, the output has a deviation of 1% or less from the function $\sin\theta$ with respect to the rotation angle $\theta$ in comparison with an input voltage to the Wheatstone bridge circuit.

In the rotation angle sensor according to the present invention, said free magnetic layer has a thickness of 1.5 to 8 nm.

In such a rotation angle sensor, since the rate of change in resistance based on a GMR effect of the giant magnetoresistive elements is large and magnetization of the free magnetic layer tends to be in the direction of the magnetic field, the output accuracy is improved further and high output sensitivity is realized.

In the rotation angle sensor according to the present invention, said rotating part has a magnet and the maximum size of the magnet in the direction of the magnetic field is five times or more of the size of the GMR element in the long-side direction of said multilayer body.

In such a rotation angle sensor, since a magnetic field generated by the magnet is uniformly applied to the multilayer bodies of the GMR elements, the output accuracy can be improved further.

In the rotation angle sensor according to the present invention, the magnetic field applied to said giant magnetoresistive elements from said rotating part has a magnitude not less than the magnitude of the saturation magnetization of said free magnetic layers.

In such a rotation angle sensor, since the magnetic fields of the free magnetic layers is equalized by the magnetic field generated by the magnet, it is not necessary to form a layer for equalizing the magnetic fields of the free magnetic layers.

The rotation angle sensor of the present invention is small and can detect the rotation angle accurately because a uniform magnetic field can be applied to the multilayer bodies without using a large magnet. Moreover, since the shape anisotropy energy of the free magnetic layer is relaxed, when the rotation angle of the magnet with respect to the giant magnetoresistive elements is $\theta$, an output is expressed by a function $\sin \theta$ with respect to the rotation angle $\theta$ and the rotation angle $\theta$ of the magnet can be accurately detected.

DESCRIPTION OF THE PREFERRED EMBODIMENTS

Figure 1:
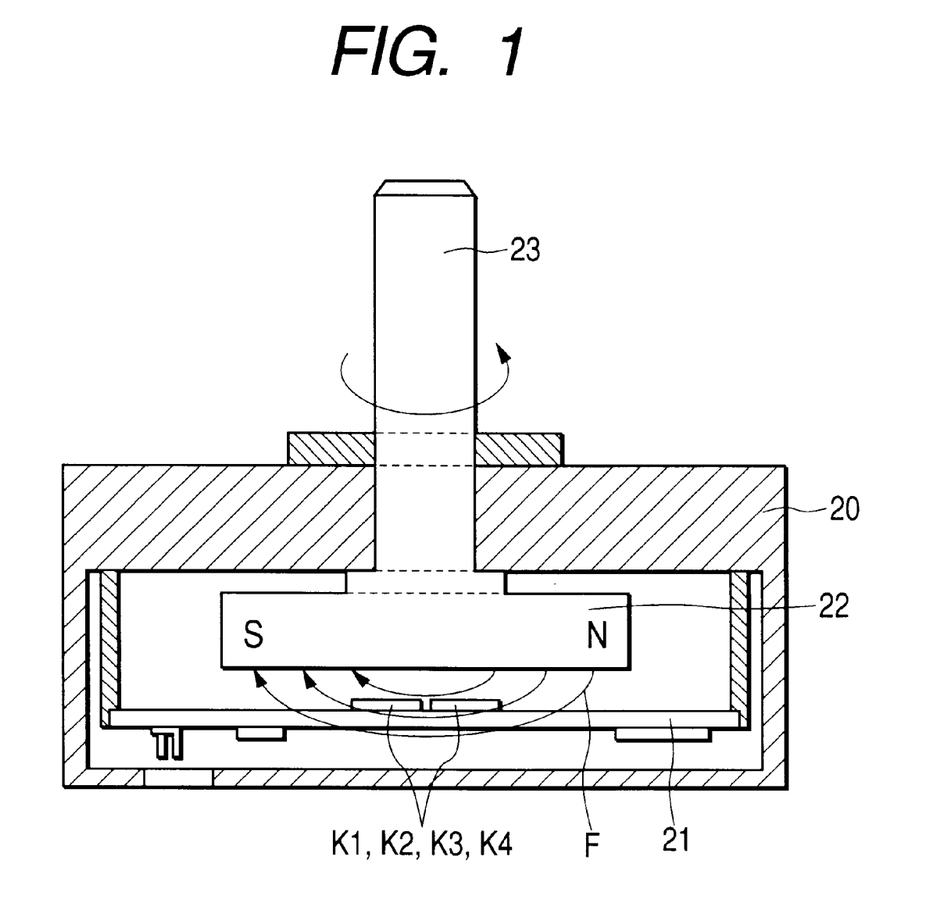
FIG. 1 is a cross-sectional view of a rotation angle sensor of the present invention.
Figure 2:
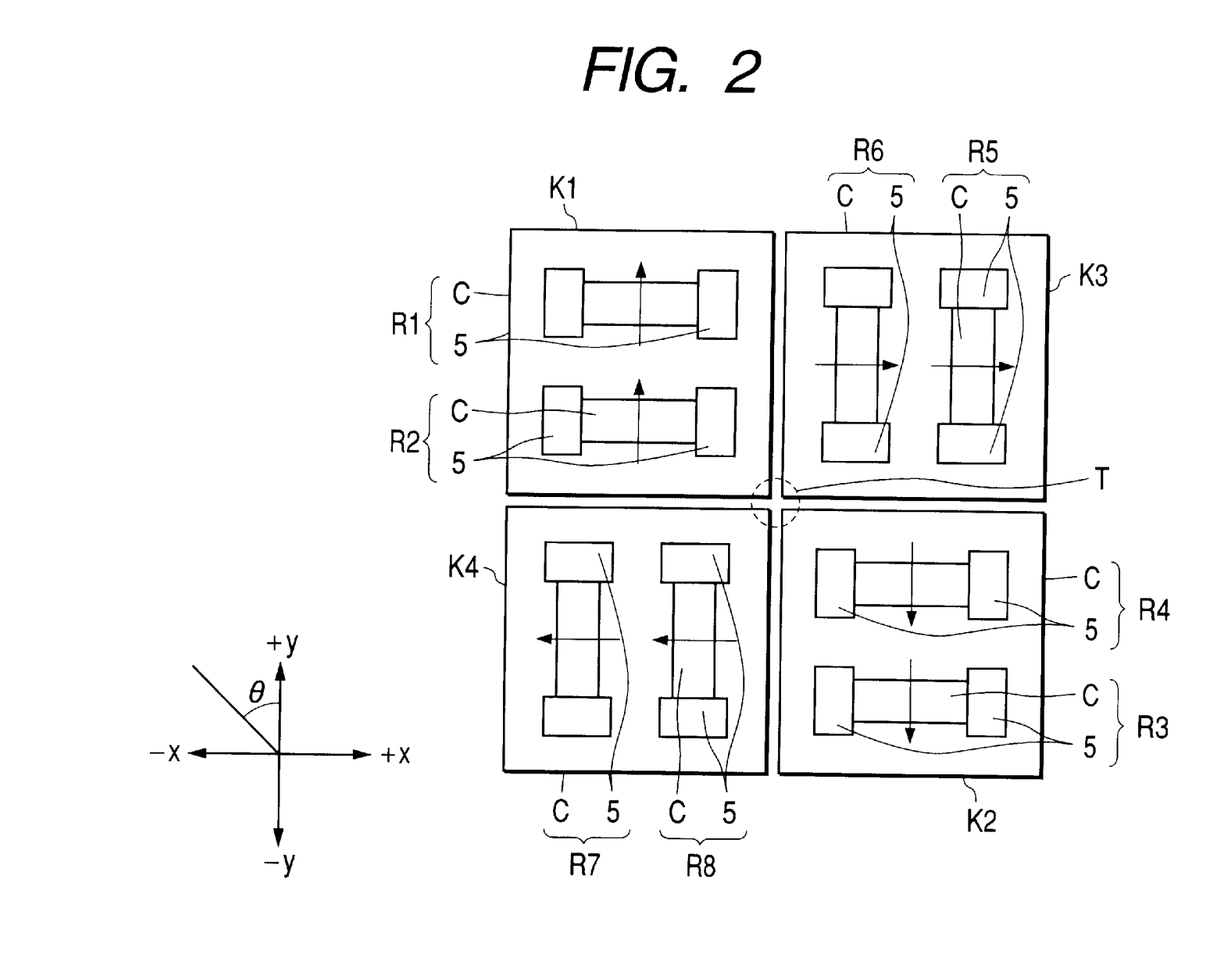
FIG. 2 is an explanatory view showing the arrangement of giant magnetoresistive elements according to the rotation angle sensor of the present invention.
Figure 3:
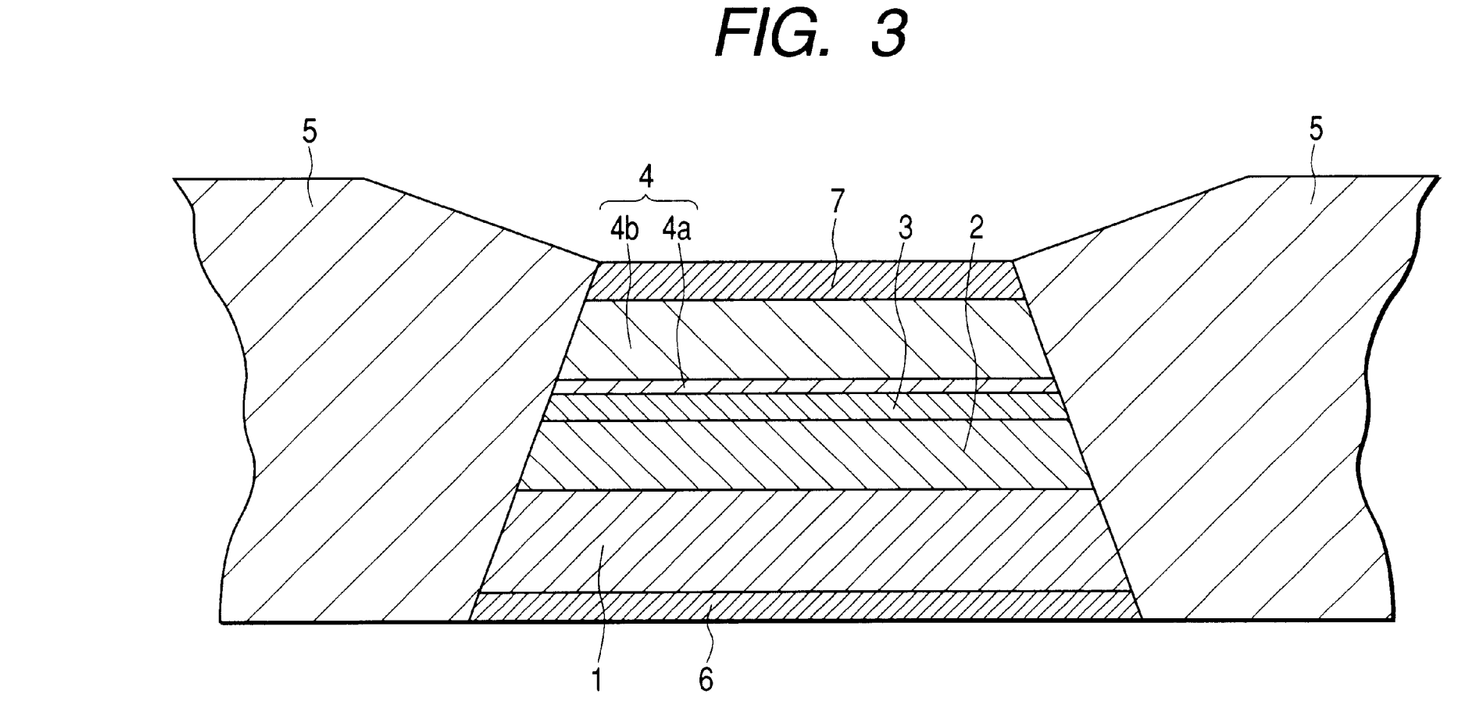
FIG. 3 is an explanatory view showing the basic structure of the giant magnetoresistive element according to the rotation angle sensor of the present invention.
Figure 4:
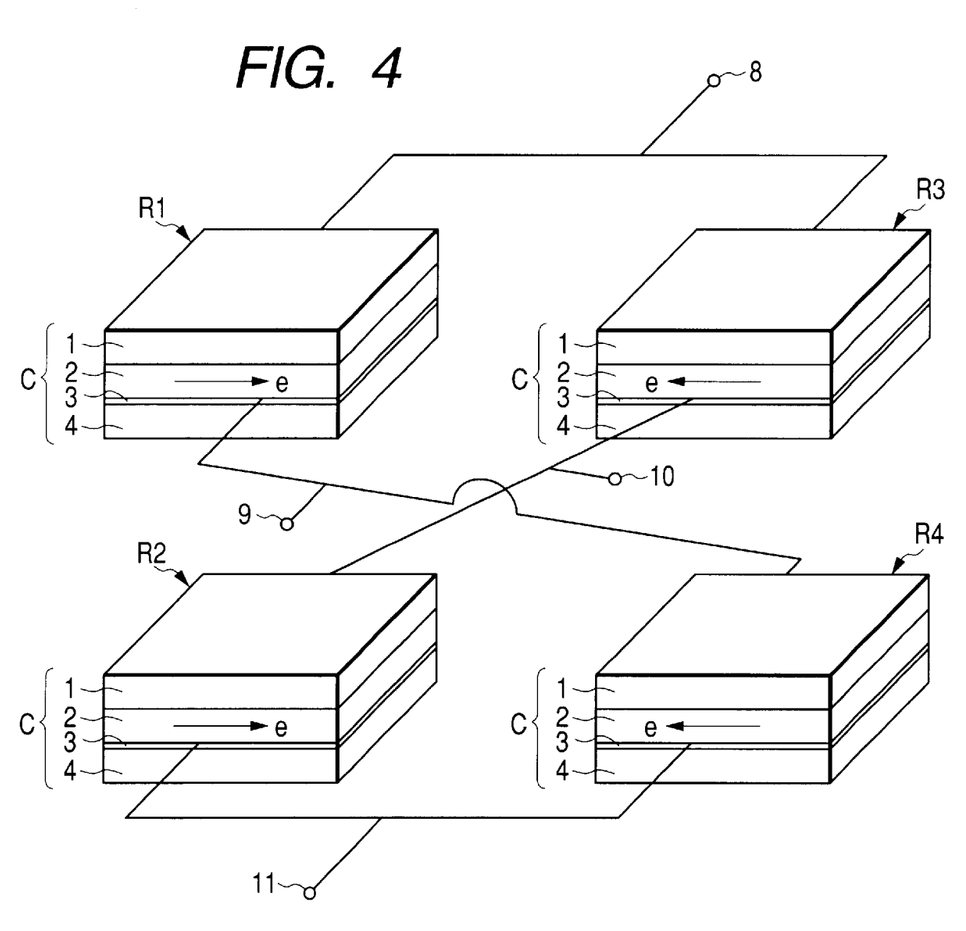
FIG. 4 is an explanatory view showing a connection state of the giant magnetoresistive elements according to the rotation angle sensor of the present invention.
Figure 5:
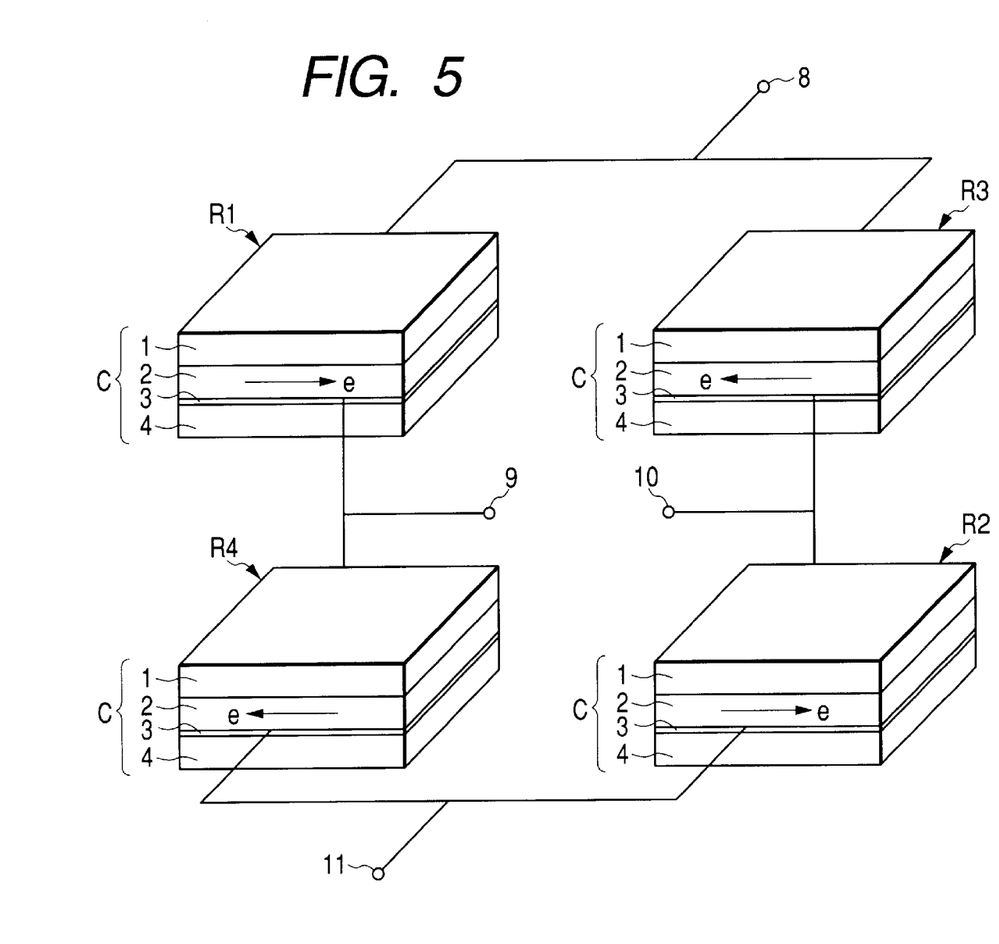
FIG. 5 is an explanatory view showing another connection state of the giant magnetoresistive elements according to the rotation angle sensor of the present invention.
Figure 6:
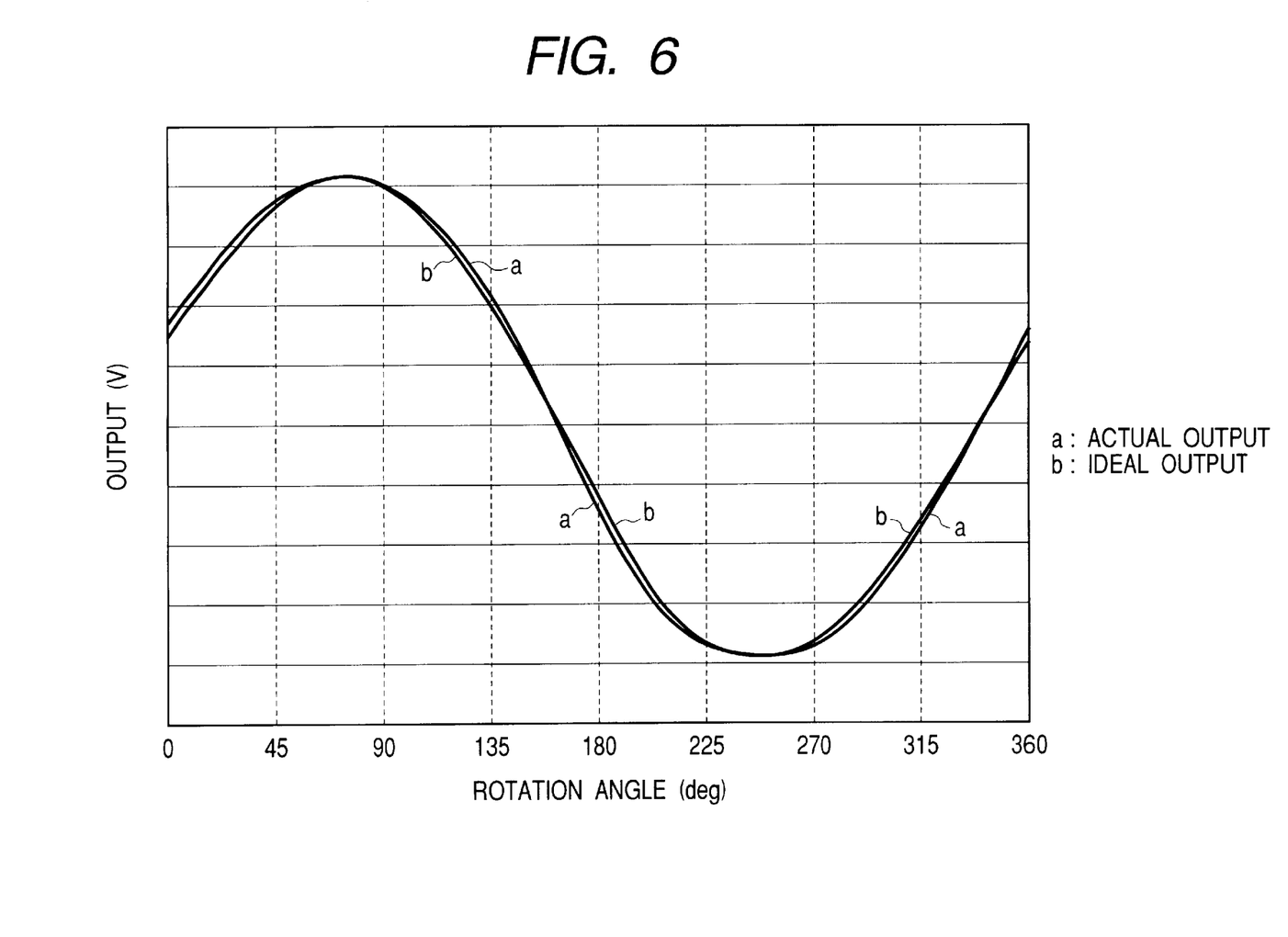
FIG. 6 is an explanatory view showing an output of the rotation angle sensor of the present invention.
Figure 7:
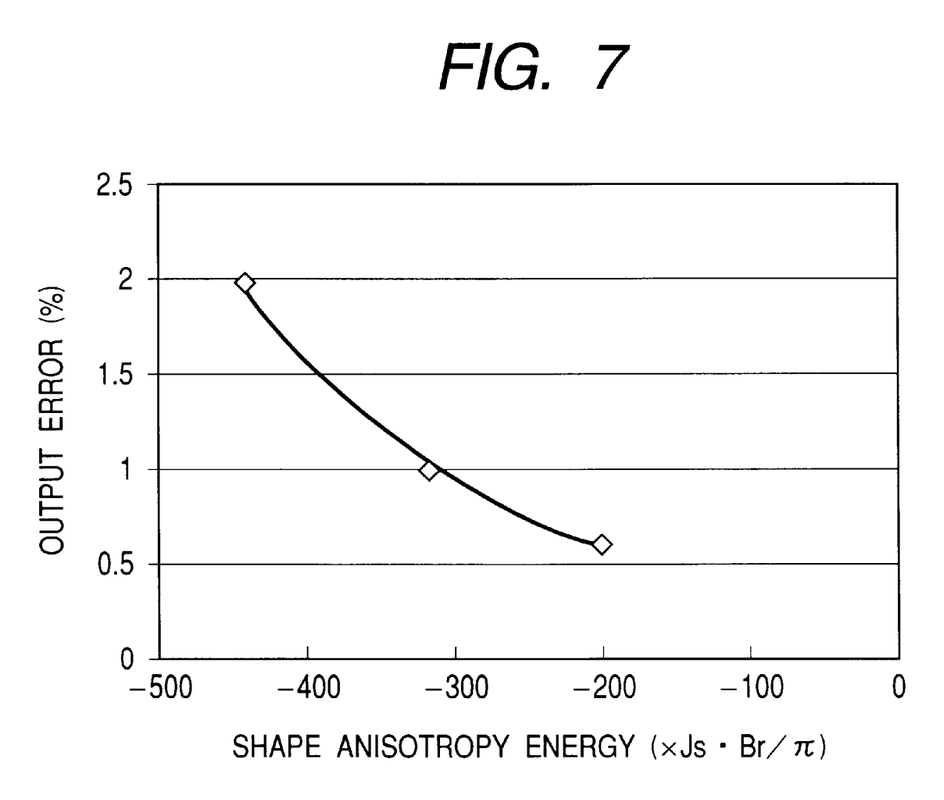
FIG. 7 is a graph showing the relation between shape anisotropy energy of the giant magnetoresistive elements according to the rotation angle sensor of the present invention and an output error of the rotation angle sensor.

The drawings of the rotation angle sensor of the present invention will be explained. FIG. 1 is a cross-sectional view of the rotation angle sensor of the present invention. FIG. 2 is an explanatory view showing the arrangement of giant magnetoresistive elements according to the rotation angle sensor of the present invention. FIG. 3 is an explanatory view showing the basic structure of the giant magnetoresistive element according to the rotation angle sensor of the present invention. FIG. 4 is an explanatory view showing a connection state of the giant magnetoresistive elements according to the rotation angle sensor of the present invention. FIG. 5 is an explanatory view showing another connection state of the giant magnetoresistive elements according to the rotation angle sensor of the present invention. FIG. 6 is an explanatory view showing an output of the rotation angle sensor of the present invention. FIG. 7 is a graph showing the relation between shape anisotropy energy of the giant magnetoresistive elements according to the rotation angle sensor of the present invention and an output error of the rotation angle sensor.

The rotation angle sensor of the present invention has, in a case 20, a flat plate-like supporting member (fixed part) 21 fixed on the case 20 and made of a non-magnetic material, and a rotating part having a disc-shaped magnet 22 made of ferrite or the like facing parallel to the supporting member 21, as shown in FIG. 1. The magnet 22 provided on the rotating part is magnetized and polarized as the north pole and the south pole on the side facing the supporting member 21, and the direction connecting the north pole and the south pole is its radial direction. The magnet 22 has a thickness of several mm and a diameter of approximately several cm.

A rotation shaft 23 made of a non-magnetic material is fixed on the rotating part and protrudes outside of the case 20. The rotation shaft 23 is rotatably supported by the case 20.

On the side of the supporting member 21 facing the magnet 22, four boards K1, K2, K3 and K4 are provided, as shown in FIG. 2. The boards K1, K2, K3 and K4 have a size of approximately several square mm and are arranged closely to each other to face a central part of the magnet 22. On the boards K1, K2, K3, K4, giant magnetoresistive elements (hereinafter referred to as GMR elements) R1, R2, R3, R4, R5, R6, R7, R8 are formed.

Each of the GMR elements R1, R2, R3, R4, R5, R6, R7, R8 is constituted by a multilayer body C made of thin films and having a rectangular planar shape, and electrode layers 5 connected to both ends in the long-side direction of the multilayer body C. The planar shape of the multilayer body C of the GMR element R has a dimension in the short-side direction (width) of 10 to several tens $\mu$m, a dimension in the long-side direction (length) of 100 to several hundreds $\mu$m, and a size of 1 mm or less. Such small-sized GMR elements R1, R2, R3, R4, R5, R6, R7, R8 enable restraint of material cost.

The multilayer body C of each of the GMR elements R1, R2, R3, R4, R5, R6, R7, R8 has an underlying layer 6, an antiferromagnetic layer 1, a fixed magnetic layer 2, a non-magnetic conductive layer 3, a free magnetic layer 4, and a protective layer 7 which are sequentially stacked, as shown in FIG. 3.

The antiferromagnetic layer 1 of the multilayer body C functions to fix the direction of magnetization of the fixed magnetic layer 2 by an exchange anisotropy field generated on its interface with the fixed magnetic layer 2, and is made of an X—Mn alloy (X is one type or two or more types of elements of Pt, Pd, Ir, Rh, Ru, and Os). The antiferromagnetic layer 1 has a thickness of approximately 8 to 20 nm, and the composition of the element X is 37 to 63% by atom, more preferably, 44 to 57% by atom.

Since such an antiferromagnetic layer 1 has excellent corrosion resistance and the exchange anisotropy field generated on the interface with the fixed magnetic layer 2 is strong, the direction of magnetization of the fixed magnetic layer P can be fixed more securely. Moreover, its blocking temperature is high and the exchange anisotropy field will not be lost even at a high temperature.

Of the X—Mn alloys, a Pt—Mn alloy has particularly excellent corrosion resistance, a particularly high blocking temperature of 350° C. or higher, and an exchange anisotropy field exceeding $6.4 \times 10^5$ (A/m). When the antiferromagnetic layer 1 is made of a Pt—Mn alloy, a thermal diffusion layer need be formed on the interface between the antiferromagnetic layer 1 and the fixed magnetic layer 2.

Such a thermal diffusion layer on the interface between the antiferromagnetic layer 1 and the fixed magnetic layer 2 can be formed by a thermal treatment process after sputtering the underlying layer 6, the antiferromagnetic layer 1, the fixed magnetic layer 2, the non-magnetic conductive layer 3, the free magnetic layer 4 and the protective layer 7 in the process of manufacturing the GMR elements R1, R2, R3, R4, R5, R6, R7, R8.

The antiferromagnetic layer 1 may also be made of an X—Mn—X' alloy (X is one type or two or more types of elements of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Sn, Hf, Ta, W, Re, Au, Pd, and rare-earth elements).

Preferably, the X—Mn—X' alloy is an interstitial solid solution in which the element X' is interstitially entered, or a substitutional solid solution in which a part of lattice points of a crystal lattice constituted by the elements X and Mn is replaced by the element X'. This enables increase in the lattice constant of the antiferromagnetic layer 1 and therefore enables formation of atom arrangements of the antiferromagnetic layer 1 and the fixed magnetic layer 2 not corresponding to one-to-one arrangements (incommensurate state) on the interface between the antiferromagnetic layer 1 and the fixed magnetic layer 2.

As the atom arrangements on the antiferromagnetic layer 1 and the fixed magnetic layer 2 are caused to be in an incommensurate state by the technique of using X—Mn—X' for the antiferromagnetic layer 1 and thus increasing the lattice constant of the antiferromagnetic layer 1, an exchange coupled magnetic field of the antiferromagnetic layer 1 and the fixed magnetic layer 2 can be made more robust.

The fixed magnetic layer 2 is made of a ferromagnetic material such as Co, NiFe alloy, CoNi alloy, CoFe alloy, CoFeNi alloy and the like, and has its direction of magnetization fixed in the direction of the width of the multilayer body C by the exchange magnetic anisotropy field generated on the interface with the antiferromagnetic layer 1.

Alternatively, the fixed magnetic layer 2 may have a three-layer structure forming an artificial ferrimagnetic state. In this case, the fixed magnetic layer 2 is constituted sequentially by a first fixed magnetic layer 2a made of Co, NiFe alloy, CoNi alloy, CoFe alloy, CoFeNi alloy or the like and formed in contact with the antiferromagnetic layer 1, a non-magnetic layer 2b made of Ru, Rh, Cr, Re, Cu or the like, and a second fixed magnetic layer 2c made of the same ferromagnetic material as the first fixed magnetic layer 2a.

The first fixed magnetic layer 2a has its direction of magnetization fixed in the direction of the width of the multilayer body C by the exchange magnetic anisotropy field generated on the interface with the antiferromagnetic layer 1. The second fixed magnetic layer 2c is magnetically bonded with the first fixed magnetic layer 2a via the non-magnetic layer 2b. The second fixed magnetic layer 2c has its direction of magnetization fixed to be antiparallel to the direction of magnetization of the first fixed magnetic layer 2a.

As the magnetization in the artificial ferrimagnetic state is fixed by the strong exchange anisotropy field with the antiferromagnetic layer 1, it will not vary even with an external magnetic field or a high ambient temperature and is thermally stable. Therefore, the direction of magnetization of the fixed magnetic layer 2 will not vary.

The non-magnetic conductive layer 3 is made of a good conductive material such as Cu and is held between the fixed magnetic layer 2 and the free magnetic layer 4, functioning to magnetically separate the fixed magnetic layer 2 and the free magnetic layer 4.

The free magnetic layer 4 has a double-layer structure having a diffusion preventive layer 4a and a soft magnetic layer 4b sequentially stacked on the non-magnetic conductive layer 3, and a thickness of 1.5 to 8 nm.

If the thickness of the free magnetic layer 4 is too large, the magnetic moment per unit area of the free magnetic layer 4 increases and the magnetization of the free magnetic layer 4 does not rotate easily, deteriorating the detection accuracy of the rotation angle sensor. On the other hand, if the thickness of the free magnetic layer 4 is too small, the rate of change in resistance between the electrode layers 5 due to the GMR effect is lowered, deteriorating the sensitivity of the rotation angle sensor.

The soft magnetic layer 4b is made of a FeNi alloy or a CoFeNi alloy. The diffusion preventive layer 4a is made of Co or a CoFe alloy and prevents the Ni atom of the soft magnetic layer 4b from mutual diffusing to the non-magnetic conductive layer 3. The diffusion preventive layer 4a is formed to be thin so as not to obstruct the magnetic property of the soft magnetic layer 4b. It has a thickness of 0.5 to 1.6 nm.

The free magnetic layer 4 may also have a synthetic ferri-structure in which first and second soft magnetic layers made of an NiFe alloy or a CoNiFe alloy face each other with a non-magnetic layer made of Ru, Rh, Os, Cr or the like held between them. With the free magnetic layer 4 of such a synthetic ferri-structure, the magnetization rotates easily and the detection accuracy of the rotation angle sensor can be improved further.

The free magnetic layer 4 is deposited by sputtering. The deposition of the free magnetic layer 4 is carried out in the absence of any magnetic field or in a rotating magnetic field in order not to give induced magnetic anisotropy to the free magnetic layer 4. On the free magnetic layer 4, the protective layer 7 made of Ta, Cr or the like is formed.

The GMR elements R formed on the boards K1, K2 are parallel to each other in the longitudinal direction of their multilayer bodies C (direction x shown in FIG. 2). Magnetization of the fixed magnetic layers 2 of the two GMR elements R1, R2 formed on the board K1 (hereinafter referred to as fixed magnetization) and fixed magnetization of the two GMR elements R3, R4 formed on the board K2 are in the opposite directions. The direction of fixed magnetization of the two GMR elements R1, R2 formed on the board K1 is a direction +y shown in FIG. 2, and the direction of fixed magnetization of the two GMR elements R3, R4 formed on the board K2 is a direction −y shown in FIG. 2.

The GMR elements R1, R2, R3, R4 formed on the boards K1, K2 constitute a first Wheatstone bridge circuit as shown in FIG. 4 or FIG. 5.

In the first Wheatstone bridge circuit, a pair of GMR elements R1 and R3 which have the opposite directions of fixed magnetization (indicated by e in FIGS. 4 and 5) are connected in parallel on the side of an input terminal 8 connected with a voltage power supply (not shown), and a pair of the GMR elements R2 and R4 which have the opposite directions of fixed magnetization are connected in parallel on the side of an earth terminal 11.

The GMR elements R1 and R4 are connected in series and also the GMR elements R3 and R2 are connected in series. As connecting parts of the series connections, output terminals 9, 10 of the first Wheatstone bridge circuit are connected at intermediate points between the GMR elements R which are connected in series, and differential outputs of voltages between the electrods 5 of the GMR elements R1 and R4 which have the opposite directions of fixed magnetization and the GMR elements R2 and R3 which have the opposite directions of fixed magnetization, are provided between the output terminals 9, 10.

Meanwhile, the two GMR elements R5, R6 formed on the board K3 and the two GMR elements R7, R8 formed on the board K4 have opposite directions of fixed magnetization. The direction of fixed magnetization of the GMR elements R5, R6 is a direction +x, and the direction of fixed magnetization of the GMR elements R7, R8 is a direction −x. The directions of fixed magnetization of the GMR elements R1, R2, R3, R4 formed on the boards K1, K2 and the directions of fixed magnetization of the GMR elements R5, R6, R7, R8 formed on the boards K3, K4 are orthogonal to each other.

The four GMR elements R5, R6, R7, R8 formed on the boards K3, K4 form a second Wheatstone bridge circuit similar to the first Wheatstone bridge circuit in which the four GMR elements R1, R2, R3, R4 formed on the boards K1, K2 are connected.

As for the magnet 22 of the rotating part, the side facing the supporting member 21 is magnetized and a magnetic field indicated by a symbol F in FIG. 1 is formed there. In each of the GMR elements R, a component parallel to the surface of the boards K1, K2, K3 K4, of the magnetic field formed by the magnet 22, is detected.

The multilayer body C of each of the GMR elements R1, R2, R3, R4, R5, R6, R7, R8 has a size of 1 mm or less, which is sufficiently smaller than the magnet 22 with a diameter of approximately several cm. Therefore, the magnetic field from the magnet will not be strained at the ends of the multilayer body C and a magnetic field with magnetic fluxes in a uniform direction as a whole is applied to each of the GMR elements R1, R2, R3, R4, R5, R6, R7, R8. To do this, it is preferred that the maximum dimension in the direction of the magnetic field of the magnet 22 (in the case of the circular magnet 22 as shown in FIG. 1, its diameter) is five times or more of the length of the long side of the multilayer body C.

Since the GMR elements R1, R2 formed on the board K1 and the GMR elements R3, R4 formed on the board K2, which constitute the first Wheatstone bridge circuit, are arranged symmetrically to each other with respect to a point T facing the center of the magnet 22, the magnitude and direction of the magnetic field to be applied by the magnet are equal. Similarly, since the GMR elements R5, R6 formed on the board K3 and the GMR elements R7, R8 formed on the board K4, which constitute the second Wheatstone bridge circuit, are arranged symmetrically to each other with respect to the point T facing the center of the magnet 22, the magnitude and direction of the magnetic field to be applied by the magnet are equal.

The magnetic force of the magnet 22 and the distance between the GMR elements R and the magnet 22 are so defined that the magnetic field of the magnet is sufficiently greater than the saturation magnetic field of the free magnetic layer 4. The typical magnet 22, made of ferrite and having a thickness of several mm and a diameter of several cm, is provided at a position approximately 3 mm away from the boards K1, K2, K3, K4 with respect to the free magnetic layer 4 having the soft magnetic layer 4b made of a FeNi alloy or a FeNiCo alloy.

As the magnet 22 rotates, the magnetic field of the magnet rotates within a plane parallel to the surfaces of the boards K1, K2, K3, K4 and the direction of magnetization of the free magnetic layer 4 of each of the GMR elements R changes to be coincident with the direction of rotation of the magnetic field from the magnet 22.

The free magnetic layer 4 is formed with such a composition as to have substantially zero magnetostriction. The deposition of the free magnetic layer 4 is carried out in the absence of any magnetic field or in a rotating magnetic field in order not to give induced magnetic anisotropy to the free magnetic layer 4. Therefore, it can be considered that the magnetic anisotropy of the free magnetic layer is due to its shape.

In the case of the rectangular free magnetic layer 4, because of the shape anisotropy energy, when the magnetic field of the magnet is applied in the long-side direction, magnetization rotates easily in the direction of the magnetic field of the magnet, and when the magnetic field of the magnet is applied in the short-side direction, magnetization does not rotate easily in the direction of the magnetic field of the magnet. In the GMR elements R1, R2, R3, R4, R5, R6, R7, R8 according to the rotation angle sensor of the present invention, since the influence of the shape anisotropy energy of the free magnetic layer 4 is relaxed, the easiness of rotation of magnetization of the free magnetic layer 4 is not largely dependent on the direction of the magnetic field of the magnet.

Since the magnetic field of the magnet is sufficiently larger than saturation magnetization of the free magnetic layers 4, the directions of magnetization of the free magnetic layers 4 are equalized by the magnetic field of the magnet. Therefore, the magnetic domains of the free magnetic layers 4 is not disturbed when the direction of magnetization rotates, and no Barkhausen noise is generated.

The rotation of magnetization of the free magnetic layer 4 is mainly led by the soft magnetic layer 4b. Magnetization of the diffusion preventive layer 4a rotates following magnetization of the soft magnetic layer 4b. Since the diffusion preventive layer 4a is formed to be sufficiently thin with respect to the soft magnetic layer 4b, it does not obstruct the rotation of magnetization of the free magnetic layer 4.

Fixed magnetization of the GMR elements R1, R2, R3, R4, R5, R6, R7, R8 is fixed by the strong exchange anisotropy field on the interface between the antiferromagnetic layer 1 and the fixed magnetic layer 2, and therefore its variance due to the magnetic field of the magnet is restrained.

In the GMR elements R1, R2, R3, R4, R5, R6, R7, R8, because of the GMR (giant magnetoresistive) effect, when the direction of magnetization of the free magnetic layer 4 becomes coincident with the direction of fixed magnetization, the electric resistance value between the electrode layers 5 is lowered, and when the direction of magnetization of the free magnetic layer 4 is opposite to the direction of fixed magnetization, the electric resistance value between the electrode layers 5 is raised.

As the rotation angle θ of the magnet 22 is represented as an angle formed by the direction from the north pole to the south pole of the magnet 22 and the direction of fixed magnetization (direction +y shown in FIG. 2) of the GMR elements R1, R2 formed on the board K1, the electric resistance value between the electrode layers 5 of the GMR elements R1, R2 formed on the board K1 reaches the maximum when the rotation angle θ is 0 degree. The electric resistance value is lowered when the rotation angle θ shifts from 0 degree to 180 degrees. The electric resistance value reaches the minimum when the rotation angle θ is 180 degrees. The electric resistance value rises when the rotation angle θ shifts from 180 degrees to 360 degrees, and then reaches the maximum value again.

An ideal electric resistance value of such GMR elements R1, R2 formed on the board K1 can be expressed by $\alpha*\sin(\theta+\beta)+R_o$ ($\alpha$, $\beta$, $R_0$ are constants based on the characteristics of the GMR elements R), where θ represents the rotation angle.

Meanwhile, the direction and magnitude of the magnetic field of the magnet applied to the GMR elements R3, R4 formed on the board K2 are the same as the magnetic field of the magnet applied to the GMR elements R1, R2 formed on the board K1. The direction of fixed magnetization of the GMR elements R3, R4 formed on the board K2 is opposite to the direction of fixed magnetization of the GMR elements R1, R2 formed on the board K1. Therefore, the change in electric resistance value between the electrode layers 5 of the GMR elements R3, R4 formed on the board K2 is the reverse of that of the GMR elements R1, R2 formed on the board K1. An ideal electric resistance value of the GMR elements R3, R4 formed on the board K2 can be expressed by $-\alpha*\sin(\theta+\beta)+R_0$, where θ represents the rotation angle.

In the first Wheatstone bridge circuit constituted by such GMR elements R1, R2, R3, R4 formed on the boards K1, K2, since the GMR elements R having the opposite changes in electric resistance value between the electrode layers 5 are connected in series, the current flowing through the GMR elements R1, R2, R3, R4 is constant and a change in voltage between the electrode layers 5 of the GMR elements R1, R2, R3, R4 is due to the change in electric resistance value between the electrode layers 5 of the GMR elements R1, R2, R3, R4.

The, first Wheatstone bridge circuit outputs a differential between the voltage between the electrode layers 5 of the GMR elements R1, R2 formed on the board K1 and the voltage between the electrode layers 5 of the GMR elements R3, R4 formed on the board K2. In such an output of the first Wheatstone bridge circuit, a magnetic noise component due to a change in magnetic field environment or the like is eliminated, and an ideal output when the rotation angle is represented by θ can be expressed by $A*\sin(\theta+\beta)+V_0$ (A, B, $V_0$ are constants), as shown in the graph of FIG. 6.

To find the constants A, B, V0 of such an ideal output $A*\sin(\theta+\beta)+V_0$, the actual output V is measured at each rotation angle θ and A=(Vmax−Vmin)/2 and $V_0$=(Vmax+Vmin)/2 are found from the maximum value Vmax and the minimum value Vmin of the actual output V while B is found from the rotation angle θ where the output is $V_0$ (equivalent to the case where the direction of the magnetic field of the magnet is orthogonal to the direction of fixed magnetization of the GMR elements).

By setting the shape anisotropy energy H of the free magnetic layers 4 of the GMR elements R1, R2, R3, R4 within a range of 0>H >−350*Js(Br/π) (where Js represents saturation magnetization of the free magnetic layer, Br represents remanent magnetic flux density of the free magnetic layer), the easiness of rotation of magnetization of the free magnetic layers 4 is prevented from being largely dependent on the direction of the magnetic field of the magnet and thus the actual output V is prevented from being deviated from the ideal output.

With the rotation angle θ of the magnet 22 within the range of 0 to 360 degrees, the ratio (δ/Vin) of a deviation δ of the actual output V from the ideal output to an applied voltage Vin of the first Wheatstone bridge circuit is not more than 1% by percentage (hereinafter referred to as output error).

The shape anisotropy energy of the free magnetic layer 4 will now be described. Since the shape of the free magnetic layer 4 is rectangular within the plane to which the magnetic field is applied, magnetization of the free magnetic layer 4 is easily directed to the direction of the magnetic field when the magnetic field is applied in the long-side direction of the free magnetic layer 4, and it does not easily directed to the direction of the magnetic field when the magnetic field is applied in the short-side direction.

Such shape anisotropy energy H is expressed by the difference between a demagnetization coefficient Ne when the magnetic field is applied in the long-side direction (easy axis of magnetization) and a demagnetization coefficient Nd when the magnetic field is applied in the short-side direction (hard axis of magnetization).

When the magnetic field is applied in the longitudinal direction, the demagnetization coefficient Ne is expressed by the following equation using the length (L), width (W) and thickness (t) of the free magnetic layer.

$$Ne = \frac{Br}{\pi}\left\{\tan^{-1}\left[\frac{W\cdot t}{2Lm\sqrt{4Lm^2+W^2+t^2}}\right] - \tan^{-1}\left[\frac{W\cdot t}{2(L+Lm)\sqrt{4(L+Lm)^2+W^2+t^2}}\right]\right\}\left(Lm=-\frac{L}{2}\right)$$

When the magnetic field is applied in the direction of the width, the demagnetization coefficient Nd is expressed by the following equation.

$$Nd = \frac{Br}{\pi}\left\{\tan^{-1}\left[\frac{L\cdot t}{2Wm\sqrt{4Wm^2+L^2+t^2}}\right] - \tan^{-1}\left[\frac{L\cdot t}{2(W+Wm)\sqrt{4(W+Wm)^2+L^2+t^2}}\right]\right\}\left(Wm=-\frac{W}{2}\right)$$

The shape anisotropy energy is expressed by the following equation using the demagnetization coefficient when the magnetic field is applied in the longitudinal direction and the demagnetization coefficient when the magnetic field is applied in the direction of the width.

$$H = \frac{Ls}{\mu_0}(Nd-Ne) \quad (\mu_0 = \text{permeability in vacuum})$$

Meanwhile, with respect to the GMR elements R5, R6 formed on the board K3 and the GMR elements R7, R8 formed on the board K4, which constitute the second Wheatstone bridge circuit, since their directions of fixed magnetization are orthogonal to the directions of fixed magnetization of the GMR elements R1, R2, R3, R4 formed on the boards K1, K2, which constitute the first Wheatstone bridge circuit, an ideal electric registance values when the rotation angle is θ can be expressed by α*sin(θ+β−90)+R$_0$ and α*sin(θ+β−90)+R$_0$.

In such an output of the second Wheatstone bridge circuit, a magnetic noise component due to a change in magnetic field environment is eliminated, similarly to the first Wheatstone bridge circuit, and an ideal output can be expressed by A*sin(θ+β−90)+V$_0$.

Similarly to the first Wheatstone bridge circuit, by setting the shape anisotropy energy H of the free magnetic layers 4 of the GMR elements R4, R5, R6, R7 within a range of 0>H>−350*Js(Br/π), the actual output V of the second Wheatstone bridge circuit is prevented from being deviated from the ideal output and has an output error of not more than 1% with the rotation angle θ within the range of 0 to 360 degrees.

In this manner, in the first and second Wheatstone bridge circuits, since their actual outputs V are close to the ideal outputs and can be expressed by A*sin(θ+β)+V0 and A*sin (θ+β−90)+V$_0$, respectively, the rotation angle θ can be univocally detected within the range of 0 to 360 degrees from the outputs V of the first and second Wheatstone bridge circuits.

In this manner, in the small GMR elements R1, R2, R3, R4, R5, R6, R7, R8 each having the multilayer body C with a size of 1 mm or less, by not only restraining magnetostriction and induced magnetic anisotropy but also setting the shape anisotropy energy H within an appropriate range, the rotation angle θ can be detected more accurately.

Although the first and second Wheatstone bridges are formed in the above-described embodiment, only one Wheatstone bridge may suffice. In such a case, the rotation angle θ can be univocally detected within a range of 180 degrees.

Moreover, though the magnet 22 is described as being disc-shaped in the above-described embodiment, the magnet 22 need not be disc-shaped as long as it can provide a magnetic field parallel to the surfaces of the board K1, K2, K3, K4 to the GMR elements R.

In the above-described embodiment, the multilayer body C of the GMR element R is described as being rectangular. However, the free magnetic layer need not be rectangular as long as the shape anisotropy energy H is within a predetermined range. For example, if the planar shape of the free magnetic layer 4 is made square, the shape anisotropy energy H can be made closer to 0.

In the above-described embodiment, the GMR elements R1, R2, R3, R4, R5, R6, R7, R8 having different directions of fixed magnetization are provided on the different boards K1, K2, K3, K4. This is because if the GMR elements R1, R2, R3, R4, R5, R6, R7, R8 are formed on the same board in the process of providing fixed magnetization of the GMR elements R1, R2, R3, R4, R5, R6, R7, R8, it is difficult provide fixed magnetization in different directions. If such difficulty in the process is not considered, the GMR elements R1, R2, R3, R4, R5, R6, R7, R8 may be provided on the same board.

EXAMPLES

In a first example, the magnet 22 made of SmCo has a diameter of 20 mm and a thickness of 5 mm, and the boards K1, K2, K3, K4 each being 1 square mm are arrayed at intervals of 0.2 mm on the supporting member 21. The structure of multilayer body each of the GMR elements R1, R2, R3, R4, R5, R6, R7, R8 includes the underlying layer 6 of Ta (with a thickness of 3 nm), the antiferromagnetic layer 1 of PtMn (with a thickness of 30 nm), the fixed magnetic layer 2 of CoFe (with a thickness of 2.5 nm), the non-magnetic conductive layer 3 of Cu (with a thickness of 2.5 nm), the free magnetic layer 4 of [Ni$_{0.8}$Fe$_{0.2}$ (with a thickness of 7 nm)/Co (with a thickness of 1 nm)], and the protective layer 7 of Ta (with a thickness of 5 nm), which are sequentially stacked. The electrode layers 5 made of Cu are connected both ends of the multilayer body C.

The planar shape of the free magnetic layer 4 is rectangular with a length of 325 μm and a width of 30 μm. In such a first example, the shape anisotropy energy was −316*Js (Br/π) and the output error was 1%.

In a second example, the structures of the magnet 22, the boards K1, K2, K3, K4, and the GMR elements R1, R2, R3, R4, R5, R6, R7, R8 are the same as those in the first example, and the planar shape of the free magnetic layer 4 is rectangular with a length of 180 μm and a width of 22 μm. In such a second example, the shape anisotropy energy was −200*Js(Br/π) and the output error was 0.6%.

In a comparative example, the structures of the magnet 22, the boards K1, K2, K3, K4, and the GMR elements R1, R2, R3, R4, R5, R6, R7, R8 are the same as those in the first and second examples, and the planar shape of the free magnetic layer 4 is rectangular with a length of 150 μm and a width of 10 μm. In such a comparative example, the shape anisotropy energy was −443*Js(Br/π) and the output error was 2%.

The graph of FIG. 7 shows the relation between the shape anisotropy energy and the output error. As can be seen from the graph of FIG. 7, the output error increases as the shape anisotropy energy decreases (large in the negative direction).

It is also found that the output error is 1% or less when the shape anisotropy energy is not less than −315*Js(Br/π).

As in the above-described examples, if the ratio (aspect ratio) of the width to the length of the free magnetic layer 4 is not less than 0.9 when the thickness of the free magnetic layer 4 is 2.8 nm, the shape anisotropy energy is not less than −315*Js(Br/π). As the thickness of the free magnetic layer 4 increases with the same aspect ratio, the shape anisotropy energy is reduced.

What is claimed is:

1. A rotation angle sensor comprising: a fixed part on which giant magnetoresistive elements are provided, each of the giant magnetoresistive elements having a multilayer body including a fixed magnetic layer with a fixed direction of magnetization, a non-magnetic conductive layer, and a free magnetic layer facing said fixed magnetic layer with said non-magnetic conductive layer held between them, and electrode layers connected both ends of said multilayer body; and a rotating part which forms a magnetic field and rotates facing said fixed part, wherein said giant magnetoresistive elements with their fixed magnetic layers having opposite directions of magnetization are provided as a pair on a surface of said fixed part, and said giant magnetoresistive elements as a pair are connected so that a difference between their resistance values is outputted, thus detecting a magnetic field component parallel to the surface of said fixed part provided from said rotating part to said giant magnetoresistive elements, wherein the size of said multilayer body of said giant magnetoresistive element is 1 mm or smaller, and when the shape anisotropy energy (H) of said free magnetic layer is expressed by H=A*Js*(Br/π), where Js represents saturation magnetization of a magnetic material forming said free magnetic layer and Br represents remanent magnetic flux density of the magnetic material forming said free magnetic layer, $-350<A<0$ holds.

2. The rotation angle sensor as claimed in claim 1, wherein said free magnetic layer has a thickness of 1.5 to 8 nm.

3. The rotation angle sensor as claimed in claim 1, wherein said rotating part has a magnet and the maximum size of the magnet in the direction of the magnetic field is five times or more of the size of the GMR element in the long-side direction of said multilayer body.

4. The rotation angle sensor as claimed in claim 1, wherein the magnetic field applied to said giant magnetoresistive elements from said rotating part has a magnitude not less than the magnitude of the saturation magnetization of a magnetic material forming said free magnetic layers.

* * * * *